(12) United States Patent
Brenner (10) Patent No.: US 7,653,909 B2
(45) Date of Patent: *Jan. 26, 2010

(54) TIME SLICING IN A SHARED PARTITION

(75) Inventor: Larry Bert Brenner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/017,452

(22) Filed: Jan. 22, 2008

(65) Prior Publication Data

US 2008/0133846 A1    Jun. 5, 2008

Related U.S. Application Data

(63) Continuation of application No. 11/221,551, filed on Sep. 8, 2005, now Pat. No. 7,370,331.

(51) Int. Cl.
*G06F 9/46* (2006.01)

(52) U.S. Cl. .......................... 718/107; 711/153; 718/1; 718/105; 718/106

(58) Field of Classification Search ................ 711/153; 714/107

See application file for complete search history.

(56) References Cited

U.S. PATENT DOCUMENTS

| | | | |
|---|---|---|---|
| 5,727,178 A | 3/1998 | Pletcher et al. | |
| 6,694,419 B1 | 2/2004 | Schnee et al. | |
| 7,290,259 B2 | 10/2007 | Tanaka et al. | |
| 2004/0243765 A1 | 12/2004 | Lee | |
| 2005/0192781 A1 | 9/2005 | Deltch | |
| 2006/0130062 A1 | 6/2006 | Burdick et al. | |
| 2006/0277551 A1 | 12/2006 | Accapadi et al. | |

OTHER PUBLICATIONS

Macon et al., "Providing an Application with Limited Control of Preemption", IBM Technical Disclosure Bulletin, vol. 38, No. 9, Sep. 1995, pp. 187-188. https://www.delphion.com/tdbs/tdb?o=95A%2061830.

Miro, "Method for Improving Utilization of a Small Cache", IBM Technical Disclosure Bulletin, vol. 38, No. 6, Jun. 1995, pp. 191-192. https://www.delphion.com/tdbs/tdb?0=95A%2061115.

"Controlled server side execution environment", IBM Research Disclosure, No. 429148, Jan. 2000, p. 184.

*Primary Examiner*—Hetul Patel
(74) *Attorney, Agent, or Firm*—Yee & Associates, P.C.; Matthew W. Baca (57) ABSTRACT

An operating system in a shared processor logical partitioned data processing system is given a target percentage. The hypervisor assigns the target processor percentage to the operating system. The operating system also has a predetermined time slice to allot to threads in a multitasking environment. The operating system adjusts the time slice based on a per-virtual-processor percentage.

5 Claims, 4 Drawing Sheets

FIG. 1
100 DATA PROCESSING SYSTEM

TIME SLICING IN A SHARED PARTITION

This application is a continuation of application Ser. No. 11/221,551, filed Sep. 8, 2005, now U.S. Pat. No. 7,370,331.

BACKGROUND OF THE INVENTION

1. Field of the Invention

The present invention relates to data processing and, in particular, to shared partitions in a logically partitioned data processing system. Still more particularly, the present invention provides a method, apparatus, and program for time slicing in a shared partition.

2. Description of the Related Art

Large symmetric multi-processor data processing systems, such as IBM eServer™ P690 server, available from International Business Machines Corporation, DHP9000 Superdome Enterprise Server, available from Hewlett-Packard Company, and the Sun Fire™ 15K server, available from Sun Microsystems, Inc. may be partitioned and used as multiple smaller systems. These systems are often referred to as logical partitioned (LPAR) data processing systems. A logical partitioned functionality within a data processing system allows multiple copies of a single operating system or multiple heterogeneous operating systems to be simultaneously run on a single data processing system platform.

A partition, within which an operating system image runs, is assigned a non-overlapping subset of the platform's physical resources. These platform allocable resources include one or more architecturally distinct processors with their interrupt management area, regions of system memory, and input/output (I/O) adapter bus slots. The partition's resources are represented by the platform's firmware to the operating system image.

Past implementations had dedicated processor paritions, where LPARs are assigned dedicated physical processors. Shared processor LPAR (SPLPAR) allows LPARs to share the physical processors of a pool of dedicated processors. With SPLPAR, partitions can be assigned fractions of physical processors from this pool, rather than full physical processor, like under the dedicated processor model.

SPLPAR allows several servers to run on one machine. For example, a customer may employ ten servers running at 100 MHz. Each server consumes electricity and generates heat. Upgrading to a single 1 GHz server allows ten instances of an operating system to run on a single machine, thus consuming less energy and generating less heat. Each server may then be implemented as a logical partition receiving 10% of the central processing unit (CPU) resources. An administrator simply sets up each operating system with a target processor percentage of 10%.

In addition to using a fraction or percentage of the physical processors, an operating system typically uses a time slice to run multiple threads. A time slice is a short interval of time allotted to each user or program in a multitasking or timesharing system. The time slice is hard coded into the operating system and does not take into account the possibility of being allocated a fraction of a physical processor in a SPLPAR system.

SUMMARY OF THE INVENTION

The present invention recognizes the disadvantages of the prior art and provides an improved time slice mechanism for operating systems running in shared processor logical partitioned data processing systems. An operating system in a shared processor logical partitioned data processing system is given a target percentage. The hypervisor assigns the target processor percentage to the operating system. The operating system also has a predetermined time slice to allot to threads in a multitasking environment. The operating system adjusts the time slice based on the processor percentage. The operating system allots the time slice to a thread running in an instance of the operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
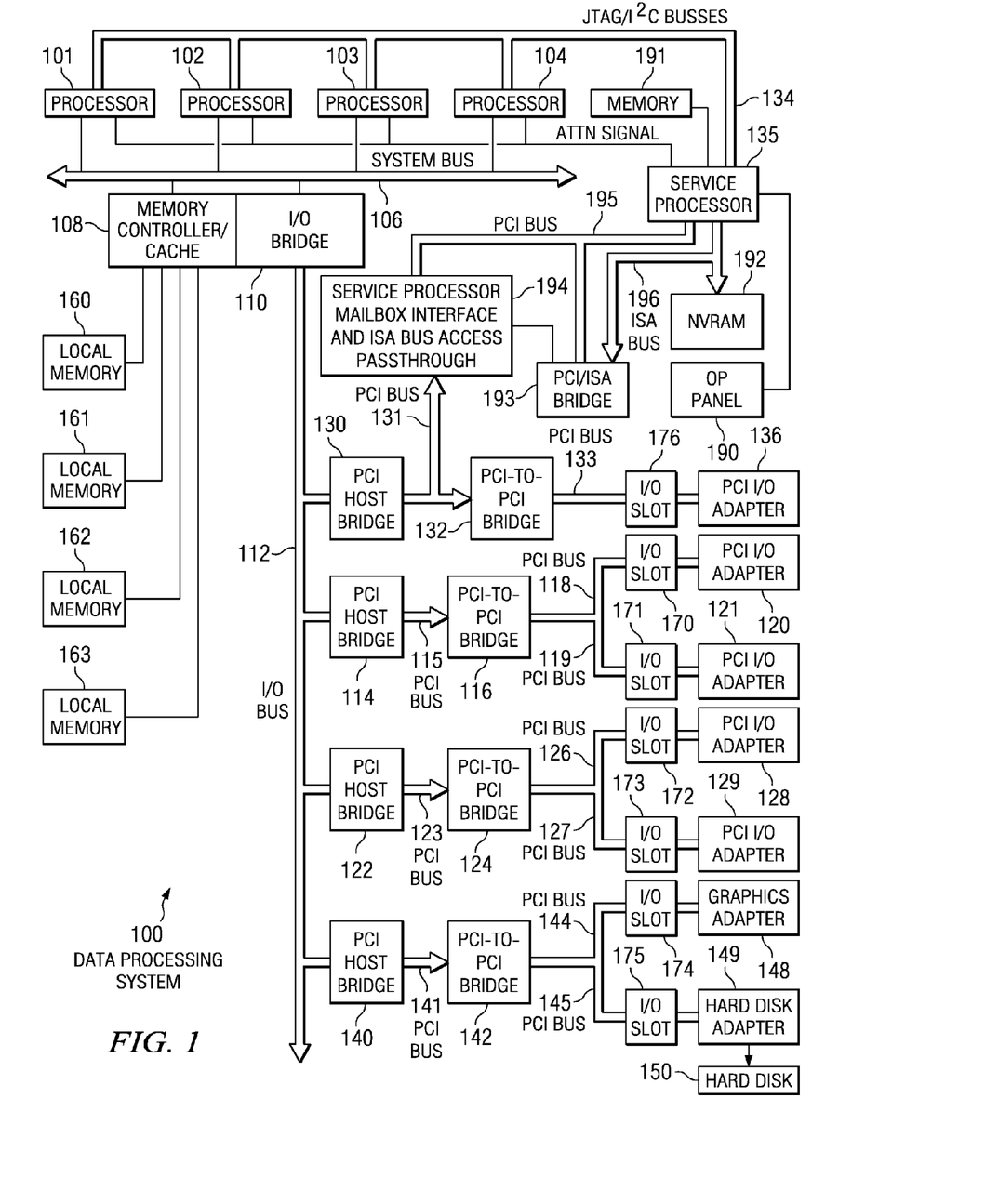
FIG. 1 is a block diagram of a data processing system in which exemplary aspects of the present invention may be implemented.
Figure 2:
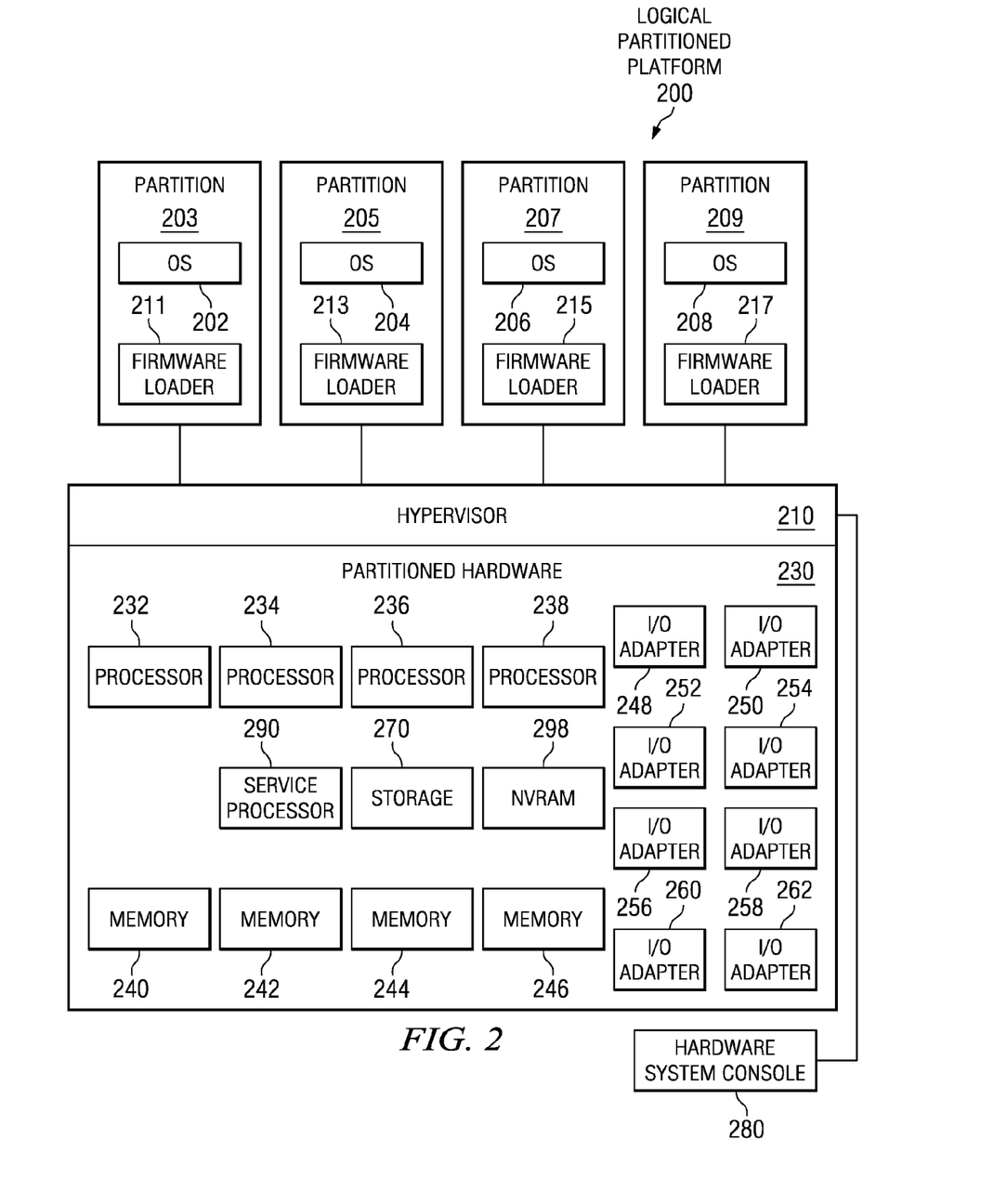
FIG. 2 is a block diagram of an exemplary logical partitioned platform in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, and in particular with reference to FIG. 1, a block diagram of a data processing system in which exemplary aspects of the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer™, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs), for example. DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. As an example, one instance of the Advanced Interactive Executive™ (AIX™) operating system may be executing within partition P1, a second instance (image) of the AIX™ operating system may be executing within partition P2, and a Windows™ operating system may be operating within logical partition P3. "Windows" is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers that are clients to data processing system 100.

An additional PCI host bridge 122 may provide an interface for an additional PCI bus 123. PCI bus 123 is connected to a plurality of PCI I/O adapters 128-129. PCI I/O adapters 128-129 may be connected to PCI bus 123 through PCT-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195.

Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. Service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM eServer™ iSeries® Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

With reference now to FIG. 2, a block diagram of an exemplary logical partitioned platform is depicted in which exemplary aspects of the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using the AIX™ operating system, which is designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented, for instance, using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Hypervisor firmware 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as hardware management console 280. Hardware management console 280 is a separate data processing system from which a system administrator may perform various functions including reallocation of resources to different partitions.

When an administrator installs and runs an operating system on a server that is not partitioned, the operating system calculates a number of operations that it can perform concurrently by counting the number of processors on the server. For example, if an administrator installs an operating system on a server that has eight processors, and each processor can perform two operations at a time, then the operating system can perform sixteen operations at a time. In the same way, when an administrator installs and runs an operating system on a logical partition that uses dedicated processors, the operating system calculates the number of operations that it can perform concurrently by counting a number of dedicated processors that are assigned to the logical partition. In both cases, the operating system can easily calculate how many operations it can perform at a time by counting the whole number of processors that are available to the operating system.

However, when an administrator installs and runs an operating system on a logical partition that uses the shared processor pool, the operating system cannot calculate a whole number of operations from the fractional number of processing units that are assigned to the logical partition. The server firmware, such as hypervisor 210 in FIG. 2, must represent the processing engines available to the operating system as a whole number of processors. The operating system acts as if it can perform as many concurrent operations as the number of virtual processors on which it is running. If the operating system has two virtual processors, and a 20% target, then it will schedule two concurrent operations. If the underlying hardware is only a single physical processing unit, then the apparently concurrent operations will not really execute concurrently.

Hypervisor 210 distributes processing units evenly among the virtual processors assigned to a logical partition. For example, if a logical partition has 1.80 physical processing units assigned to it and an operating system running in the partition includes two virtual processors, then each virtual processor has 0.90 processing units supporting its workload.

A logical partition generally performs best if the number of virtual processors is close to the number of processing units available to the logical partition. This lets the operating system manage the workload on the logical partition effectively. In certain situations, one may be able to increase system performance slightly by increasing the number of virtual processors. If the number of virtual processors is increased, then the number of operations that can run concurrently is increased. However, if the number of virtual processors is increased without increasing the number of physical processing units, then the speed at which each operation runs will decrease. The operating system cannot shift processing power between processes as well if the processing power is split among many virtual processors.

When an administrator creates a partition profile, hardware system console 280 may calculate a minimum, maximum, and desired number of virtual processors for the partition profile. The calculation is based upon the minimum, maximum, and desired number of processing units that are specified for the partition profile. When the administrator activates the logical partition using the partition profile, hypervisor 210 assigns a number of processing units to the logical partition corresponding to the desired number of virtual processors.

A processing unit assigned by hypervisor 210 may be a single physical processor chip or one of a plurality of processing cores in a single physical chip, for example. If a physical processor is a symmetric multi-threading (SMT) processor that is capable of running two threads simultaneously, then the operating system may use threads as another sharing mechanism, which also has the potential of slowing down virtual cpu performance as compared to using the same processor without threading.

In a shared processor LPAR (SPLPAR) environment, hypervisor 210 may allocate a single processing unit to multiple operating systems. For example, partition 207 and partition 209 may share processor 232. A system administrator typically sets up a partition profile for a copy of an operating system to run in a partition and, in an SPLPAR environment, sets a target processor percentage, which indicates a fraction of a processing unit on which the operating system is intended to run. In the above example, two instances of an operating system, such as the AIX™ operating system, may be set up to run on a single physical processor. The partition profiles of the operating system instances may indicate that each operating system is to have two virtual processors. In this example, each operating system instance may be given a target processor percentage of 50%. Each virtual processor will have a per-virtual-processor percentage of 25%.

Processor percentages may be capped or uncapped. If a partition is capped, then the partition may be assigned up to its target processor percentage, but not more. If a partition is uncapped, then hypervisor 210 may assign more than the target processor percentage. In the above example, if partition 207 and partition 209 are uncapped and one or more processors are idle, then hypervisor 210 may assign each partition up to 100% of a processing unit or more than 100%.

Figure 3:
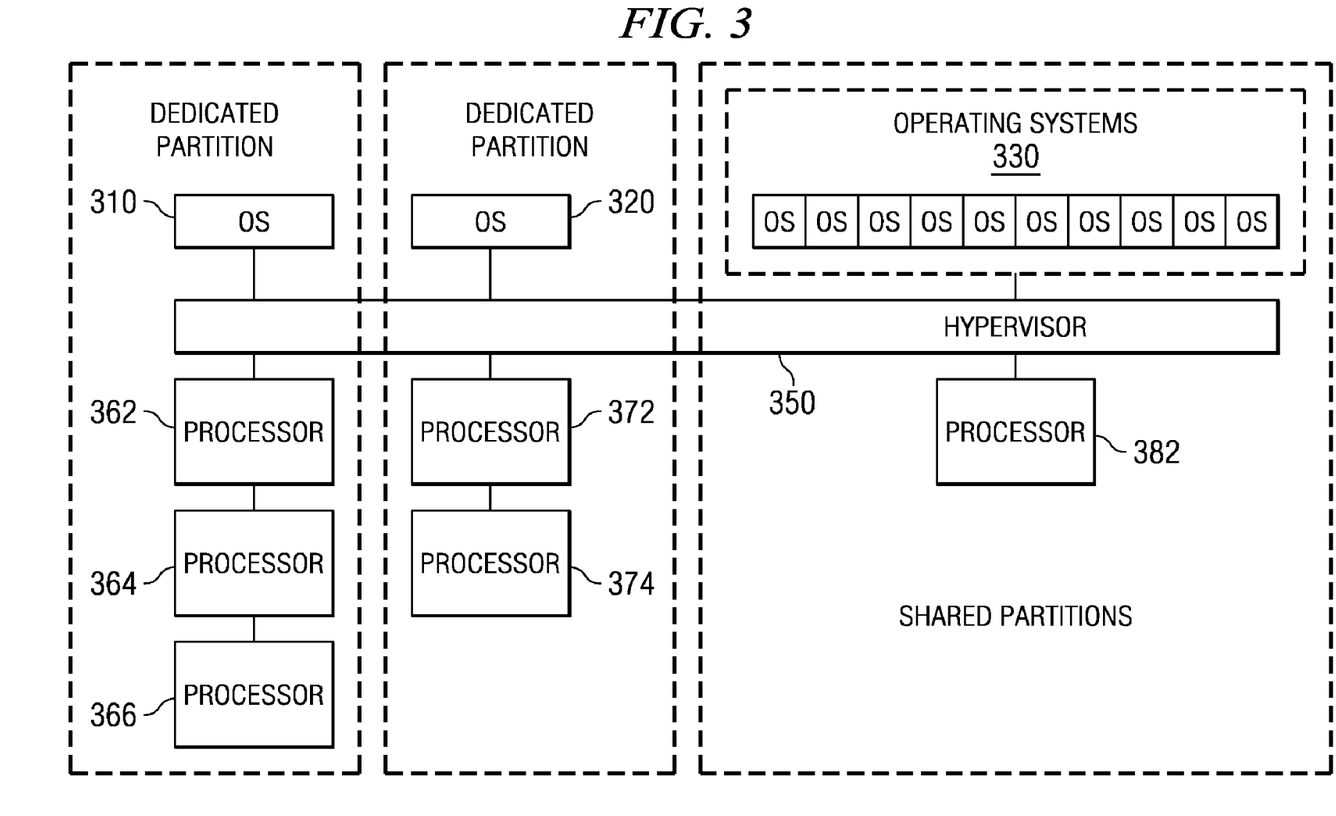
FIG. 3 is a block diagram illustrating processor allocation in a shared processor logical partitioned data processing system in accordance with exemplary aspects of the present invention.

FIG. 3 is a block diagram illustrating processor allocation in a shared processor logical partitioned data processing system in accordance with exemplary aspects of the present invention. Hypervisor 350 allocates resources to operating system (OS) instance 310, OS instance 320, and OS instances 330. The OS instances in FIG. 3 may be multiple copies of the same operating system, such as the AIX™ operating system, or various combinations of operating systems, including the AIX™ operating system, the LINUX™ operating system, and the like.

In the depicted example, hypervisor 350 assigns processors 362, 364, 366 to OS instance 310. Hypervisor 350 also assigns processors 372, 374 to OS instance 320. OS instances 310 and 320 run in dedicated partitions. In addition, based on configuration by a system administrator, such as through hardware system console 280 in FIG. 2, for example, hypervisor 350 assigns processor 382 to OS instances 330. OS instances 330 run in shared partitions, all serviced by processor 382. While the example shown in FIG. 3 shows one processor servicing the shared partitions, any number of processors may be allowed to service the shared partitions. The system administrator assigns each of OS instances 330 an individual target processor percentage.

Since OS instances 310 and 320 run in dedicated partitions, assigning a target percentage is unnecessary. For OS instances 330, hypervisor 350 assigns the target processor percentage to the respective virtual processors of the OS instances in the shared partitions. As a specific example not meant to imply any limitations on the present invention, OS instances 330 may include ten operating system instances, each with one virtual processor, and each may be assigned a target processor percentage of 10%. As another example, OS instances 330 may include ten operating system instances, each with two virtual processors. The total target processor percentage would still be 10%, but the per-virtual-processor percentage would then be 5%. In these cases, hypervisor 350 may assign processor 382 to these operating system instances in a time slicing manner to meet the target processor percentage.

Many operating systems provide multitasking or multithreading. In other words, an operating system may run multiple programs, or multiple threads within a single program, concurrently or seemingly concurrently. Operating systems may accomplish this by time slicing. Each thread is given a slice of time, referred to as the time slice, to operate before giving up the resources used by the operating system to another thread. A typical time slice may be 10 ms, although the time slice may vary depending upon the operating system or the implementation. Regardless, the time slice is typically static and hard-coded into the operating system code. Alternatively, an operating system may run a timing loop to discover the speed of the processor as a possible way to determine the time slice. Note that this would not help in a shared partition, because such a loop would merely discover the underlying (higher) speed of the native processor, unless such a loop ran for a significant length of time, of course, which might be considered inefficient.

When an operating system performs multiprocessing or multithreading in a SPLPAR environment, anomalies may occur. For example, an operating system may have a time slice of 10 ms and a target processor percentage of 10%, thus using 10% of a processing unit. The operating system may maintain a priority value for each thread. The priority value is a positive integer and varies inversely with the importance of the associated thread. That is, a smaller priority value indicates a more important thread. When the operating system's scheduler looks for a thread to dispatch, it chooses a dispatchable thread with a smallest priority value. A developer may give a thread a "nice" value by using a NICE command, which makes the thread's priority less favorable. In other words, "nice" threads give way to higher priority threads.

A developer may assign priority values and nice values very carefully so that more critical threads run first, but "nice" threads run eventually. However, if the operating system gives each thread a 1 ams time slice, or any other predetermined time slice, and the virtual processor is given only 5%, as an example, of a processing unit, then the "nice" threads may never run. Other anomalies may occur due to the operating system not taking a SPLAR environment into account when allotting a time slice to a thread.

In accordance with exemplary aspects of the present invention, the operating system is modified to adjust the time slice value based on the target processor percentage. In the special case where a partition contains too few processing units to be able to deliver the target processor percentage, the time slice is adjusted accordingly. In other words, if a target per-virtual-processor percentage is greater than 100%, then the time slice is not adjusted.

Furthermore, if the operating system is allocated a percentage time-wise of a SMT processor, the operating system may decide to run multiple threads on a SMT processor. However, the operating system may not know exactly what percentage of the processor it will get per thread. If the two threads use different execution units, then the threads may run virtually simultaneously and each thread will get closer to 100% of a processor. In reality, threads may get close to 70% of a processor when running as a thread in a SMT processor. Therefore, in one exemplary embodiment, if an operating system receives a percentage time-wise of a SMT processor, the operating system may further adjust the time slice based on an anticipated percentage of a true processor's capability the operating system receives. As a specific example not intended to imply any limitations to the claimed invention, an operating system may cautiously assume that a thread in a SMT processor will be equivalent to 70% of a true processor's capabilities. In this example, the operating system may further decrease the time slice, such as by multiplying the value by 70%.

Figure 4:
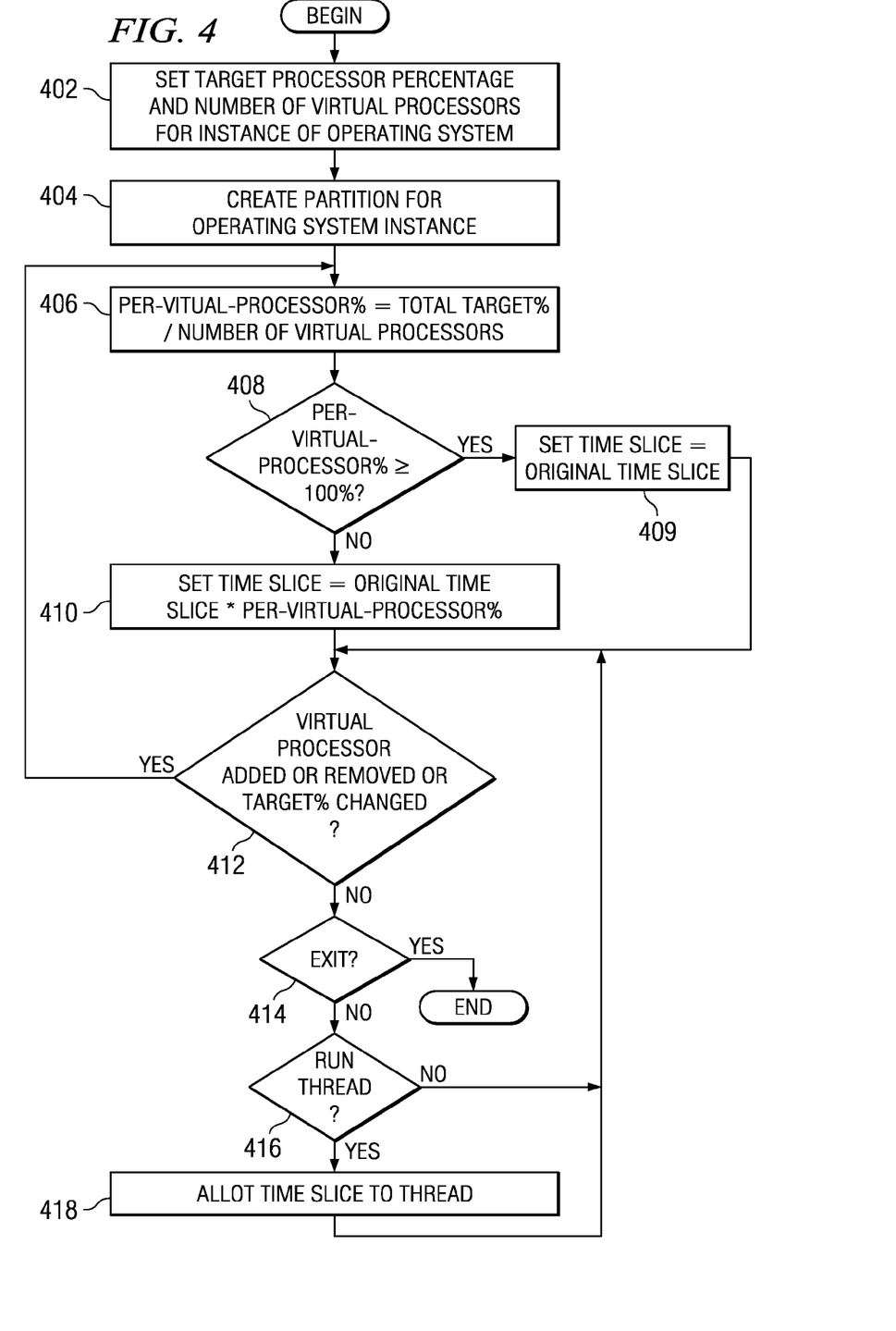
FIG. 4 is a flowchart illustrating the operation of a time slice mechanism in an operating system running in a shared processor logical partitioning environment in accordance with an exemplary embodiment of the present invention.

FIG. 4 is a flowchart illustrating the operation of a time slice mechanism in an operating system running in a shared processor logical partitioning environment in accordance with an exemplary embodiment of the present invention. Operation begins and an administrator sets the target processor percentage and the number of virtual processors for an instance of an operating system (block 402). The hypervisor creates a partition for the operating system (block 404).

When the hypervisor creates the partition for the operating system, the hypervisor assigns the total target processor percentage to the partition. The operating system then determines the per-virtual-processor percentage by dividing the total target processor percentage by the number of virtual processors assigned to the operating system instance (block 406).

Next, the operating system determines whether the target per-virtual-processor percentage is greater than or equal to 100% (block 408). The time slice should not be adjusted upward. Therefore, if the target per-virtual-processor percentage is greater than or equal to 100%, then no adjustment is made to the time slice. The operating system sets the time slice to be equal to the original time slice value (block 409) and operation proceeds to bock 412 to determine whether one or more virtual processors are added or removed or whether the target processor percentage is changed.

If the per-virtual processor percentage is less than 100% in block 408, the operating system adjusts the time slice by multiplying the time slice value by the per-virtual-processor percentage (block 410). Thus, as an example, if the time slice is 10 ms, the operating system is assigned two virtual processors, and the target percentage is set to 20%, then the time slice value is adjusted to be 1 ms (10 ms·(20%/2)). Thereafter, operation proceeds to block 412 to determine whether one or more virtual processors are added or removed or whether the target processor percentage is changed.

If a virtual processor is added to or removed from the partition or if the target processor percentage has changed for the partition in block 412, then operation returns to block 406 to recalculate the per-virtual-processor percentage and to adjust the time slice, if necessary. If a virtual processor is not added to or removed from the partition and the target processor percentage is not changed for the partition in block 412, then the operating system determines whether an exit condition exists (block 414). An exit condition may occur, for example, when the partition shuts down or when the data processing system shuts down. If an exit condition exists, operation ends.

If an exit condition does not exist in block 414, the operating system determines whether to run a thread (block 416). If the operating system is not to run a thread, operation returns to block 412; otherwise, the operating system allots the time slice to the thread (block 418) and operation returns to block 412.

Thus, the exemplary aspects of the present invention solve the deficiencies of the prior art by providing an improved time slice mechanism for operating systems running in shared processor logical partitioned data processing systems. An operating system may then run multiple threads with finely tuned priorities in a shared processor logical partitioned environment without encountering the anomalies that might otherwise occur.

If an operating system instance is to run in a shared partition, it may be assigned, as an example, a 20% target percentage and two virtual processors. With a 1 GHz processor, the operating system may see this as being assigned two 100 Mhz processors. However, in reality, the operating system in this example is actually getting a time slice of a 1 GHz processor. Therefore, performing multithreading may cause anomalies. In accordance with the exemplary aspects of the present invention, the operating system accounts for the SPLPAR environment by adjusting the time slice value based on the per-virtual-processor percentage.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable storage or computer-readable storage medium providing program code for use by or in connection with a computer or any instruction execution system. For the purposes of this description, a computer-usable storage or computer readable storage medium can be any apparatus that can contain, or store the program for use by or in connection with the instruction execution system, apparatus, or device.

The computer-usable storage or computer-readable storage medium can be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus, comprising:
a pool of shared processing units; and
a hypervisor, wherein the hypervisor assigns one or more processing units from the pool of shared processing units to a plurality of partitions in a shared processor logical partitioned environment;

wherein a given partition within the plurality of partitions is configured to run an instance of an operating system;

wherein the instance of the operating system identifies a processor percentage, wherein the processor percentage is a percentage of a physical processing unit used by the given partition, wherein the instance of the operating system is assigned a number of virtual processors, and wherein identifying the processor percentage comprises calculating a processor percentage per virtual processor to form a per-virtual-processor percentage;

wherein the instance of the operating system adjusts a previously assigned time slice based on the processor percentage to form an adjusted time slice, wherein adjusting the previously assigned time slice comprises multiplying a value of the previously assigned time slice by the per-virtual-processor percentage, and wherein the instance of the operating system allots the adjusted time slice to a thread running in the instance of the operating system.

2. The apparatus of claim 1, wherein the instance of the operating system identifies the processor percentage by identifying a target processor percentage for the instance of the operating system.

3. A computer program product, comprising:

a computer usable storage medium having computer usable program code for time slicing in a shared processor logical partitioned environment, the computer usable program code comprising:

computer usable program code for identifying a processor percentage for an instance of an operating system running in a given partition in the shared processor logical partitioned environment, wherein the processor percentage is a percentage of a physical processing unit used by the given partition, wherein the instance of the operating system is assigned a number of virtual processors, and wherein identifying the processor percentage comprises calculating a processor percentage per virtual processor to form a per-virtual-processor percentage;

computer usable program code for adjusting a previously assigned time slice based on the processor percentage to form an adjusted time slice, wherein adjusting the previously assigned time slice comprises multiplying a value of the previously assigned time slice by the per-virtual-processor percentage; and computer usable program code for allotting the adjusted time slice to a thread running in the instance of the operating system.

4. The computer program product of claim 3, wherein the physical processing unit is a processor chip or a processor core on a processor chip.

5. The computer program product of claim 3, wherein the physical processing unit is a symmetric multi-threading processor, the computer usable program code further comprising:

computer usable program code for adjusting the previously assigned time slice based on an anticipated percentage of a processor's capabilities provided by a thread in the symmetric multi-threading processor.

* * * * *